Jan. 18, 1927.  
O. A. CLARK ET AL  
1,614,522
BOX MAKING MACHINE
Filed Dec. 29, 1922  6 Sheets-Sheet 5
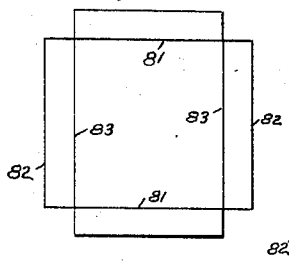
Fig. 32.
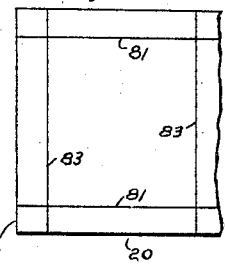
Fig. 31.
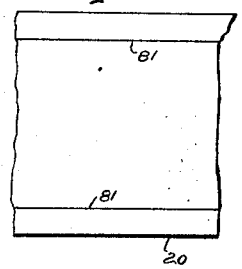
Fig. 30.
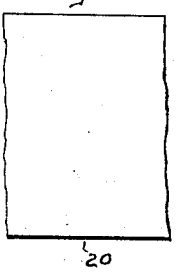
Fig. 29.
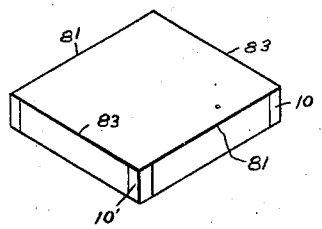
Fig. 35.
Fig. 33.
Fig. 34.
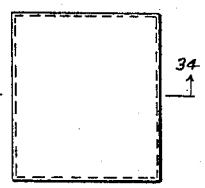
Fig. 38.
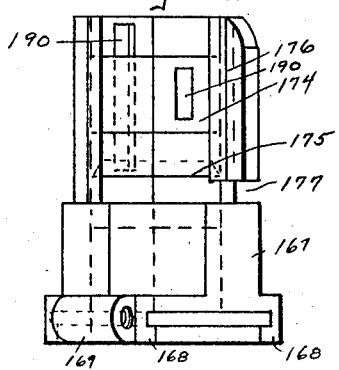
Fig. 37.
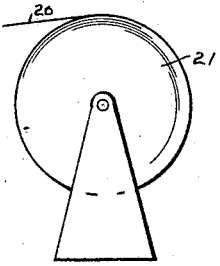
Fig. 36.
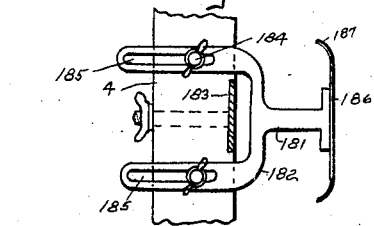
INVENTOR.  
Orlando A. Clark  
BY George P. Anderson  
Erwin Wheeler & Woolard  
ATTORNEYS

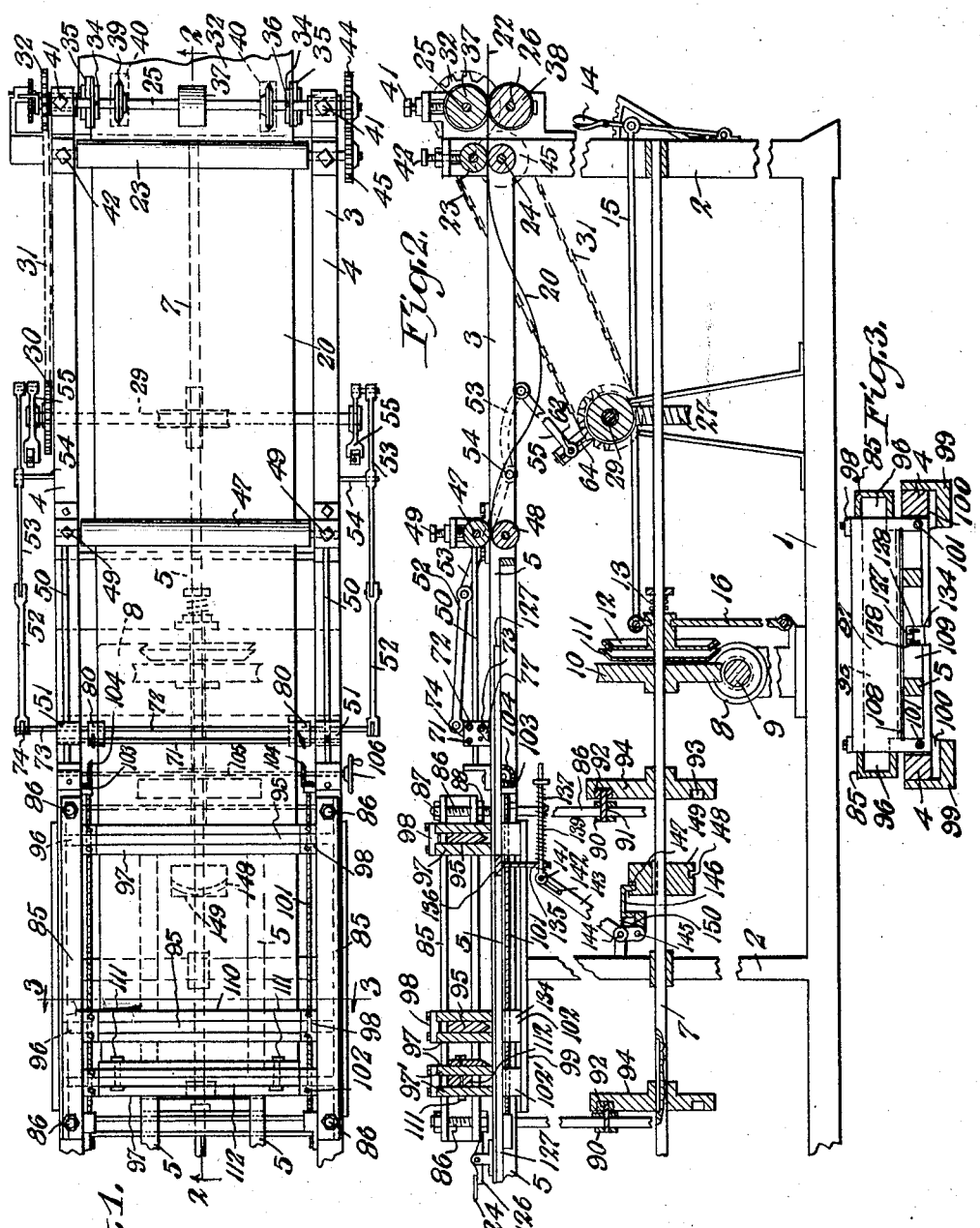

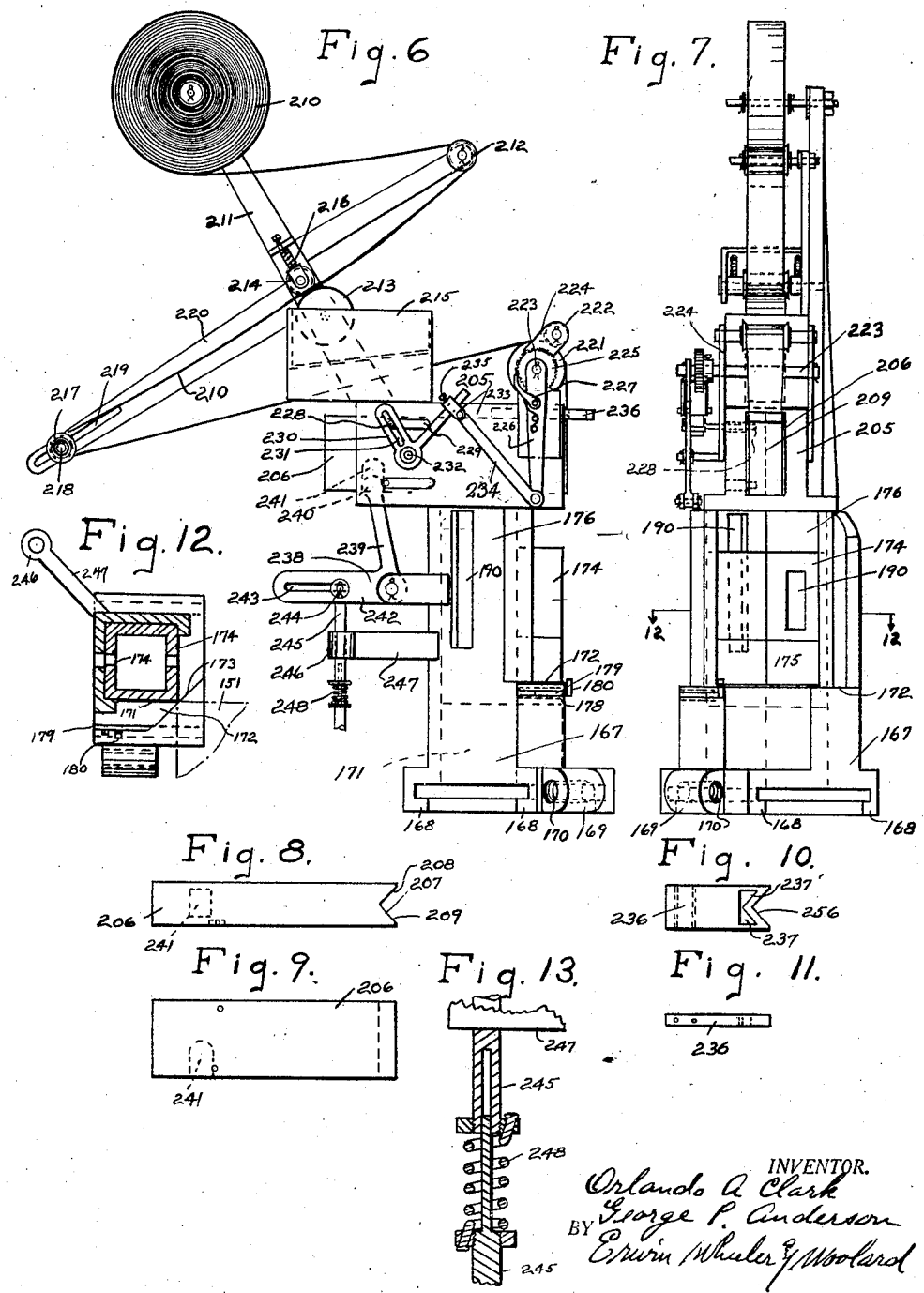

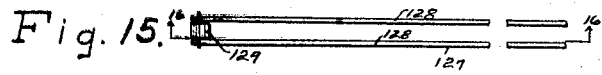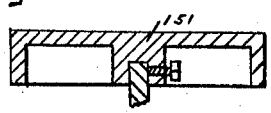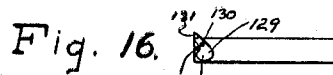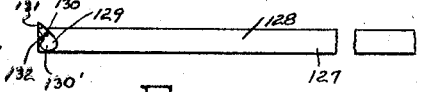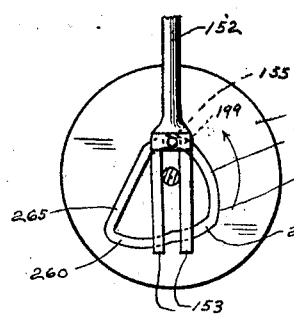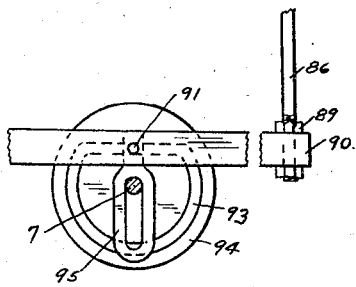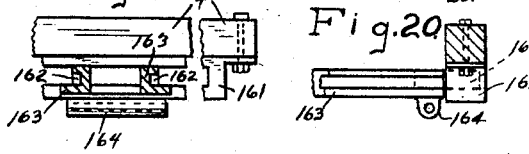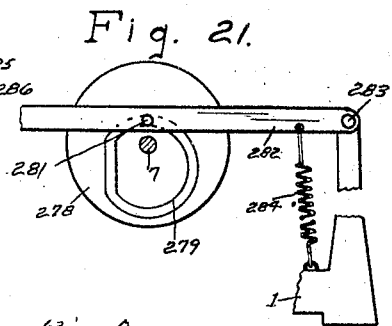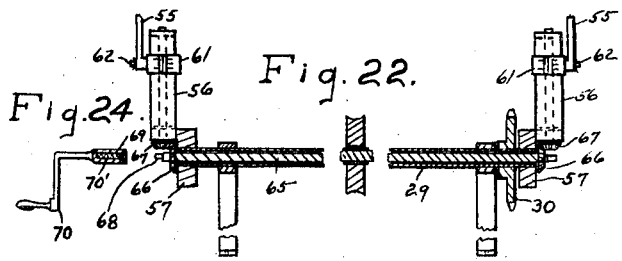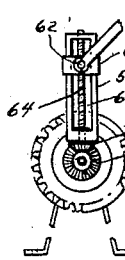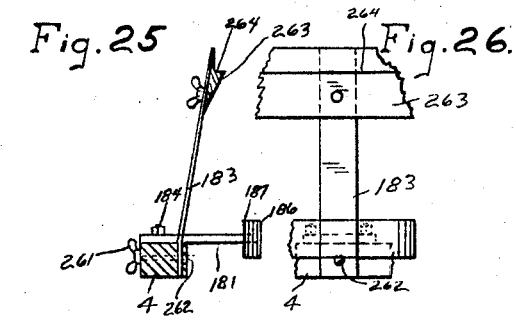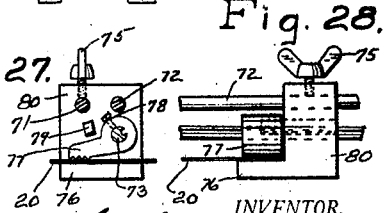

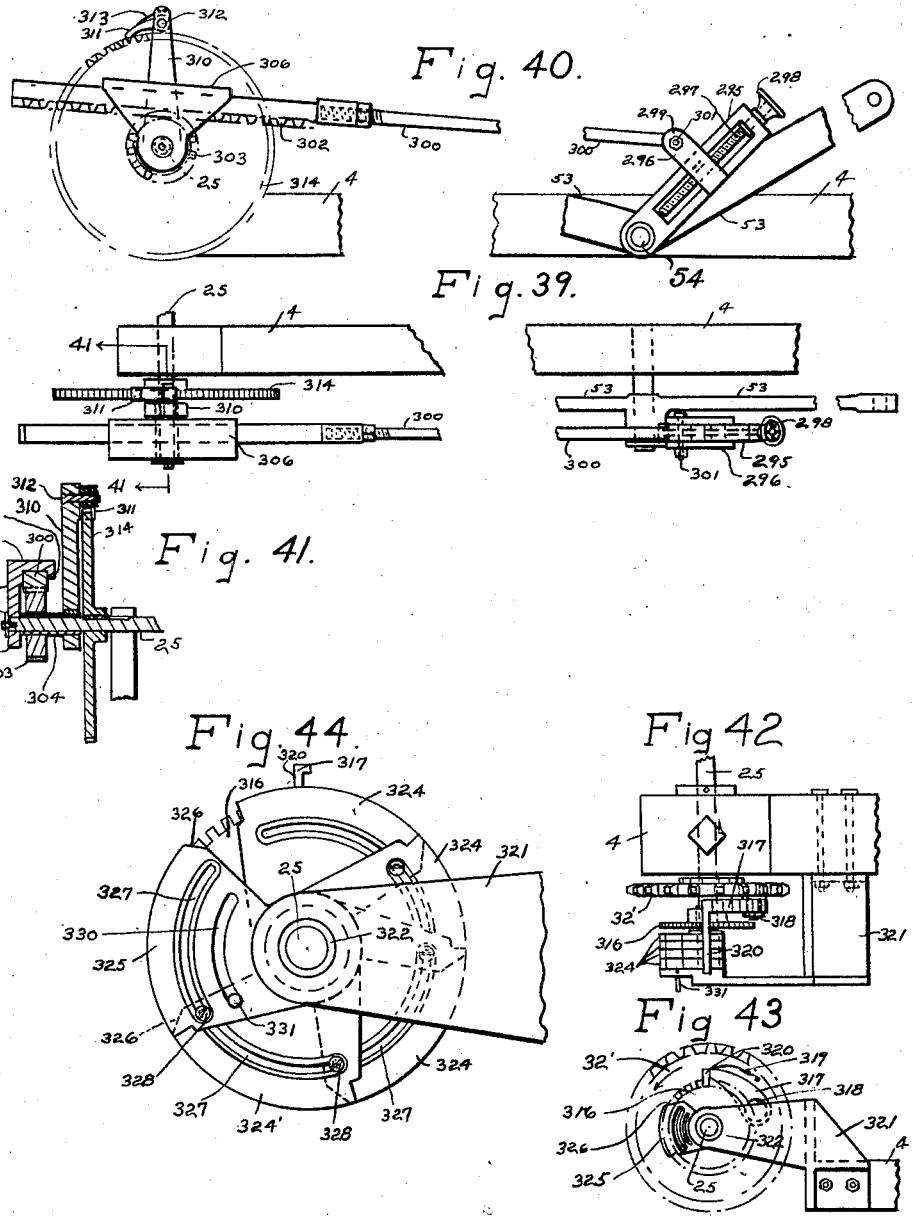

Patented Jan. 18, 1927.

1,614,522

UNITED STATES PATENT OFFICE.

ORLANDO A. CLARK AND GEORGE P. ANDERSON, OF MILWAUKEE, WISCONSIN.

BOX-MAKING MACHINE.

Application filed December 29, 1922. Serial No. 609,642.

This invention relates to improvements in box making machines.

It is the primary object of this invention to provide an automatically operable mechanism for manufacturing paper or cardboard boxes complete without the intervention of any human agency, whereby the human element is eliminated as far as possible from the manufacture of boxes of paper, cardboard, pasteboard, and the like. The machine hereinafter to be described is supplied with stock from a roll, cuts therefrom a properly shaped blank, folds the side margins of the blank into box shape, and secures corners of said margins together to form a completed box, the entire procedure being mechanical and automatic.

It is a further extremely important object of this invention to provide a box making machine adjustable through a wide range to vary the length, width, or depth, or all three of said dimensions, of the boxes to be manufactured by it whereby a single machine may be utilized for the manufacture of a great number of different types of boxes.

In thus making our machine adjustable, however, we have not lost sight of the desirability of making its action entirely automatic in each given adjustment. It has been our aim, also, to simplify the mechanism to such an extent that there is little opportunity for breakage or excessive wear, and that the machine can operate indefinitely without supervision.

In box forming machines which have heretofore been used, it has quite generally been the practice to feed the blanks downwardly during the forming operation. It is one of the objects of this invention to secure a better organization of a box manufacturing machine by operating the forming die from beneath the blank and feeding the blanks upwardly at the time of forming.

It has also been common practice to cut the blanks by hand and to feed each blank manually to a device for cutting away the corner portions thereof to permit the side margins to be folded to form the sides of a box. In furtherance of our object to eliminate the human element as far as possible, we have devised a machine wherein material can be supplied thereto from a roll and continuously used by the machine in the automatic manufacture of boxes. In one single machine, we have provided means for cutting a rectangular blank from said roll and for scoring said blank at the points at which the sides are to be folded. The corners of the blank are simultaneously cut away in an entirely automatic manner and the side margins having been folded at right angles to the remainder of the blank are automatically fastened together at their corners. In no case is human intermediation required.

In order to make our machine adjustable for use in the manufacture of different sizes of boxes, it has been necessary to provide in many instances adjustable feeding mechanism in order that the rate of feed of the materials may conform to the rate at which the materials are used. For example, we employ a gummed tape for the purpose of securing together the sides of the boxes at the corners. When the depth of a box is varied, it is necessary to vary proportionately the length of the strip of gummed tape supplied to the corners of the box for sealing purposes. Where the box to be manufactured is small, it is necessary to adjust the reciprocatory feeding mechanism hereinafter to be described to feed into the machine a relatively short length of material for each blank. When, however, a longer box is to be manufactured, the length of the blank is correspondingly greater and the feeding mechanism must be adjusted to supply the desired quantity of stock. It is a further object of this invention to provide a machine wherein not only the box forming mechanism proper is adjustable, but wherein the several feeding mechanisms are correspondingly adjustable so that the entire machine can be properly synchronized to operate as satisfactorily in any given adjustment as if it were a machine designed solely for the manufacture of boxes of that given size. To accomplish this purpose, we have devised a number of adjustments and a number of mechanical movements which are adapted to find a particular field of usefulness in conjunction with the remainder of this machine.

In the drawings:

Fig. 1 is a plan view of that portion of the machine which initially receives the stock, trims it, scores it, and severs a blank therefrom.

Fig. 2 is a section taken on line 2—2 of Fig. 1.

Fig. 3 is a detailed sectional view taken upon line 3—3 of Fig. 1.

Fig. 6 is a side elevation upon an enlarged scale of the corner sealing mechanism shown in Figs. 4 and 5.

Fig. 7 is an end elevation of the corner sealing mechanism.

Fig. 8 is a detail view in plan of the corner forming plunger die mechanism.

Fig. 9 is a side elevation of the same.

Fig. 10 is a detail view in plan of the tape guard forming a part of the mechanism shown in Figs. 6 and 7.

Fig. 11 is a side elevation of the guide shown in Fig. 1.

Fig. 12 is a cross sectional view taken on line 12—12 of Fig. 7.

Fig. 13 is a detail view on an enlarged scale of the resilient shaft shown in Fig. 6.

Fig. 14 is a detail view of the box forming plunger and the actuating mechanism therefor.

Fig. 15 is a detail view in plan of a blank positioning device.

Fig. 16 is a section taken on the line 16—16 of Fig 15.

Fig. 17 is a detail view in end elevation of a cam mechanism for actuating the scoring and cutting devices.

Fig. 18 is a detail view in plan illustrating the sliding connection between the main frame of the machine and the members supporting the uprights for the corner forming mechanism.

Fig. 19 is a side elevation of the parts shown in Fig. 18.

Fig. 20 is an end elevation of the same parts.

Fig. 21 is a detail of cam mechanism utilized to actuate an ejector for delivering completed boxes from the machine.

Fig. 22 is a detail view in end elevation of a variable throw crank mechanism, whereby the reciprocatory feeding device is adjustably operated.

Fig. 23 is a side elevation of the parts shown in Fig. 22.

Fig. 24 is a detail of a special handle whereby the variable throw crank mechanism shown in Figs. 22 and 23 is adjusted.

Fig. 25 is a detail view in end elevation of a resilient box supporting element and a blank guide.

Fig. 26 is a side elevation thereof.

Fig. 27 is a detail in side elevation of reciprocatory cardboard feeding mechanism.

Fig. 28 is an end elevation of the device shown in Fig. 27.

Figure 4:
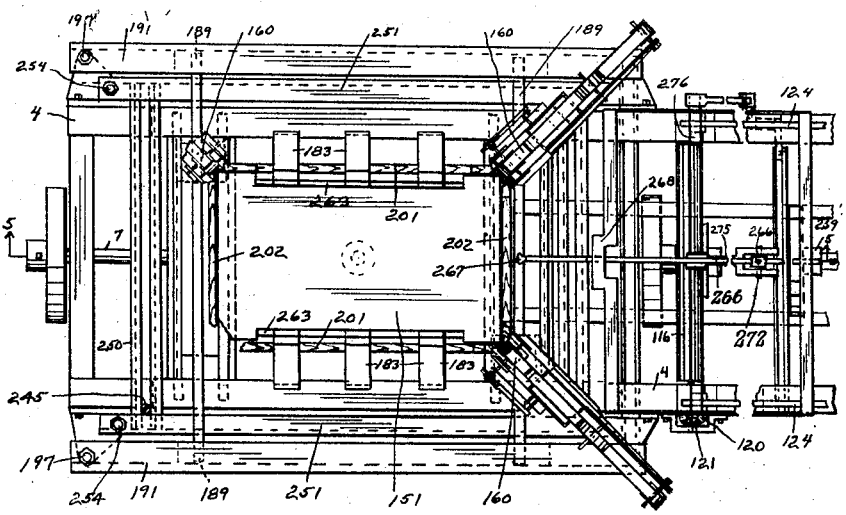
Fig. 4 is a plan view of those portions of the machine not shown in Fig. 1. The mechanism shown in Fig. 4 receives the blank severed as aforesaid, cuts the corners from it, folds its side margins to comprise the sides of the box, provides strips of gummed and moistened material for sealing each corner of the box, and finally ejects from the machine the completed article.

Figs. 29 to 32, inclusive, illustrate the successive steps in which the box forming blank is trimmed and scored.

Fig. 33 is a plan view of a partially completed box.

Fig. 34 is a section taken on line 34—34 of Fig. 33.

Fig. 35 is an isometric drawing of the completed product of the machine embodying this invention.

Fig. 36 is a detail view of the roll from which stock is fed to this machine.

Fig. 37 is a fragmentary illustration similar to Fig. 7 but illustrating one of the units first encountered by the infed blanks, the slot through which said blanks are fed being shown.

Fig. 38 is a detail view in plan of the guide which may be used if desired at the sides of the machine to assist in positioning blanks upon the box forming plunger.

Fig. 39 is a detail view in plan of a special mechanism which may be utilized if desired to actuate the mechanism for feeding the stock into the machine.

Fig. 40 is a side elevation of the same.

Fig. 41 is a section taken on line 41—41 of Fig. 39.

Fig. 42 is a detail view in plan of a modified mechanism which may be substituted for the mechanism shown in Figs. 39 and 40.

Fig. 43 is a side elevation of the mechanism shown in Fig. 42.

Fig. 44 is a detail view upon an enlarged scale of certain adjustable cam elements shown in Figs. 41 and 42.

Like parts are identified by the same reference characters throughout the several views.

It is contemplated that this machine shall include a machine bed 1 from which is supported by suitable uprights 2 a table 3, of which the principal parts are the longitudinally disposed members 4 which preferably extend from end to end of the machine and serve as a mounting for all those elements which act upon the material during the formation of a box therefrom. Other longitudinally disposed elements 5 functioning as supports to keep the material from sagging may be utilized wherever such supports are necessary, as will hereinafter be brought out.

An attempt has been made to simplify the actuating mechanism of this machine, and, accordingly, a line shaft 7 extending the full length of the machine is provided. This shaft may conveniently be driven from a motor 8 through a worm 9, a worm gear 10 rotatably mounted upon said shaft, and a friction clutch 11, the member 12 of which is splined to shaft 7 for axial movement with reference thereto in the usual way. A spring 13 normally presses the clutch member 12 against its complementary member and maintains the worm gear 10 in operative driving relation to shaft 7. The member 12 may be retracted, however, by a lever 14 connected by link 15 to a clutch shifting fork 16 in operative engagement with the shiftable clutch member 12 as shown.

The stock 20 from which the boxes are to be made is preferably supplied to the machine from a roll shown at 21 in Fig. 36. It enters the machine at 22 in Figs. 1 and 2. It is, of course, attempted to supply the stock in widths as nearly as possible that of the desired length. The stock is drawn by the feed rolls 23 and 24 past a trimming and scoring mechanism which will now be described.

Upper and lower transverse shafts 25 and 26 are so journaled that the material 20 drawn by feed rolls 23 and 24 will pass between them. Shaft 25 is positively driven from the line shaft 7 by a worm wheel 27, worm 28, transverse shaft 29, sprocket wheel 30, chain 31, and sprocket wheel 32 upon driven shaft 25. Disk-like shearing knives 34 and 35 are disposed upon shafts 25 and 26, respectively. The faces of said knives are in contact and overlap slightly so that they have a shearing action upon material drawn between them. Each knife is adjustable by means of a set screw 36 in its hub whereby it may be positioned as desired upon its supporting shaft. The shafts 25 and 26 are preferably also provided with rollers 37 and 38, respectively, said rollers being disposed centrally upon their respective shafts and being adapted to confine between them the material drawn through the feeding rolls 23 and 24 whereby said material is prevented from buckling under the action of the shearing knives 34 and 35. The driven shaft 25 is provided with disklike scoring blades 39 which press the material against supporting rollers 40 carried by the idling shaft 26. Longitudinal scores or creases are thereby made in the material 20, indicating the points at which said material will be bent to form the sides of the box. The arrangement is preferably such that shaft 25 can be adjusted bodily with reference to shaft 26 by means of a set of adjusting screws 41.

The feeding rollers 23 and 24 are preferably also made relatively adjustable by means of screws 42. The upper roll 23 may be permitted to idle and the lower roll 24 may be actuated from shaft 25 by means of intermeshing gears 44 and 45, whereby the feeding rolls and the cutting and scoring devices will revolve in the same direction at substantially the same peripheral speed.

Inasmuch as the mechanism herein disclosed is preferably all made adjustable for the manufacture of boxes of varying sizes, it will be necessary to adjust the rate of feed of the rollers 23 and 24 to correspond to the rate of feed of the reciprocatory feeding mechanism which next engages the stock. To this end, various sizes of sprocket wheels 32 may be utilized upon shaft 25 if desired. In order, however, that it may not be necessary to change the sprocket wheel to secure different relative speeds of the feeding mechanism which first acts upon the stock, we have provided two different types of adjustments which may be substituted for the chain 31 and sprocket wheel 32, as heretofore described.

Reference is made to Figs. 39, 40 and 41 of the drawings which show one type of adjustment in which the feed, having once been properly adjusted, will be accurately proportioned thereafter to the reciprocatory feeding mechanism without any necessity for further adjustments. This will be true even though the stroke of the reciprocatory mechanism is varied.

The reciprocatory feeding mechanism is actuated through an oscillatory lever 53 pivoted at 54 and provided with means for giving it a variable degree of oscillation from the line shaft 7. The means by which the degree of oscillation is controlled and adjusted will hereinafter be described. It is sufficient for the present to make it clear that the oscillation of lever 53 is communicated through suitable motion transmitting connections to a reciprocatory feeding device, the movement of which is thereby proportioned in degree to the oscillations of said lever.

To the end that the variation in the degree of oscillation of lever 53 may be utilized to control the feeding action of the feed rollers 23 and 24, the lever 53 may be provided with a longitudinally slotted arm 295, upon which a nut 296 is radially slidable. Disposed longitudinally of the slot within said arm, is a screw 297 provided exterior to said arm with a hand wheel 298 for its manual actuation. The screw 297 is in threaded engagement with the nut 296 which is slidably carried by said arm, and the arrangement is such that the rotation of the hand wheel 298 can be utilized to impart a radial movement to the nut 296 causing it to move inwardly or outwardly upon said arm.

The nut 296 is provided with an upstanding ear 299 to which a rack bar 300 is pivotally connected at 301. Rack teeth 302, carried by said bar, mesh with a pinion 303 keyed to a sleeve 304 upon shaft 25, which is extended to a length greater than that shown in Fig. 1 to receive said sleeve. A bracket 305 having arms 306 provided with overhanging portions 307 slidably engages the upper surface of the rack bar 300, whereby said bar is maintained in contact with the pinion 303. The hub 308 of the bracket 305 is loosely journaled upon the extremity of shaft 25 and may be positioned thereon by a collar 309 at the end of said shaft.

Keyed to sleeve 304 and freely revoluble therewith is a radially projecting lever 310 having adjacent its periphery a dog 311 pivotally secured to it by a pin 312. A spring 313 normally presses said dog inwardly into contact with a ratchet wheel 314 fast upon shaft 25. The arrangement is such that the reciprocatory movement of the rack 302 is transmitted directly to the pinion 303, sleeve 304 and lever 310. The dog 311 insures that in one direction the lever 310 will rotate freely upon shaft 25 without transmitting its motion thereto through the ratchet wheel 314. In the other direction, however, the dog 311 will engage the teeth of ratchet wheel 314 and will thereby drive shaft 25.

The screw 297 and nut 296 upon the lever arm 295 permits the throw or reciprocatory movement of rack bar 300 to be varied with respect to the degree of oscillation of lever 53. Thus, for any given setting of the reciprocatory feeder hereinafter to be described, the rotary feeding rolls 23 and 24 can be adjusted through the screw and nut 297 and 296 to correspond. Furthermore, when the proportion has once been obtained, it will be obvious that thereafter the movement of the feeding rollers 23 and 24 will adjust itself automatically to correspond to any adjustment of the reciprocatory feeding mechanism since both the reciprocatory feeding mechanism and the rollers 23 and 24 derive their variable movement through a single oscillatory lever 53.

As an alternative for the above described variable feed for shaft 25, the mechanism shown in Figs. 42, 43 and 44 may be used. The devices shown in these three views utilize the drive of chain 31 as previously described, but it is necessary to make an independent adjustment to secure from said chain a variable speed for the shaft 25.

In the modified construction, a sprocket wheel 32' is loosely mounted upon shaft 25, being free to rotate thereon. A ratchet wheel 316 is fast upon said shaft and is arranged to be driven normally by a dog 317 pivoted at 318 to the sprocket wheel 32' and maintained normally in operative engagement with the teeth of the ratchet wheel 316 by means of a spring 319. The operative head 320 of the dog, however, is extended laterally in the manner clearly illustrated in Fig. 42 and a cam of adjustable peripheral extent is utilized to lift the dog 317 out of operative engagement with the teeth of ratchet wheel 316 during a predetermined portion of the rotative movement of said wheel.

The elements comprising the adjustable cam above referred to are carried by a bracket 321 secured to the frame member 4 of the machine in the manner indicated. A sleeve 322 supported from said bracket is concentric with shaft 25, and, in fact, the extremity of said shaft may be received into the sleeve if desired. Segmental cam elements 324 to any desired number are journaled upon the sleeve 322 and are pivotally adjustable upon said sleeve with reference to the bracket 321 and to each other.

The extremity 325 of bracket 321 preferably corresponds exactly in its radius and contour to each of the several segmental cam elements 324. One corner of the bracket and of each member 324 is beveled, as indicated at 326. The bracket portion 325 in reality constitutes a fixed cam segment.

The bracket portion 325 and each of the adjustable cam segments 324 is slotted in the manner indicated at 327. Set screws 328 mounted in each adjustable cam segment 324 extend through the slot 327 in the next adjacent segment of the series and permit said segments to be secured to each other in any desired adjustment so that their combined periphery may equal any desired proportion of a full circle greater than the peripheral extent of the fixed segment 325 which comprises the extremity of bracket 321.

In Figs. 42 and 43, the several segments are shown to be aligned axially behind the fixed segment 325. With the cam segment in this position, the shaft 25 would receive a maximum degree of actuation from the continuous movement of sprocket wheel 32'. As said sprocket wheel revolves, the lateral extension 320 of dog 317 will ride upon the bevel face 326 of all the cams simultaneously and will move about their combined peripheries until it drops back into engagement with teeth of ratchet wheel 316. If, however, a lesser movement of shaft 25 during each rotation of sprocket wheel 32' were desired, the peripheral extent of the cam could be extended by loosening the set screws 328 sufficiently to permit one or more of the segments 324 to be rotated about sleeve 322 to the desired extent. Thereupon the screws 328 could be tightened and the dog 317 would remain out of contact with the teeth of sprocket wheel 316 for a greater length of time. In Fig. 44, the cam segments are shown almost completely extended and it will be noted that the dog would be permitted only a very short period of contact with the teeth of the ratchet wheel before it would again be lifted.

Where minor adjustments are desired—for example, if the machine were in motion and it were desired to change to some slight degree the relative rate of rotation between feed rollers 23, 24 and the reciprocatory feeder hereinafter to be described, it is possible to make such adjustments by means of a special slot 330 in the fixed cam segment 325. A pin 331 fast in the movable cam segment 324′ extends through said slot to a position where it may readily be grasped by the operator. By this means, the single screw 328 having been loosened, the entire group of movable cam segments 324, 324′ may be moved as a unit with reference to the fixed cam segment 325, thereby changing to some slight degree the peripheral extent of the cam.

The above described mechanism will be recognized to constitute a separate and distinct way in which the rotative movement of shaft 25 and the associated feed rollers 23, 24 may be varied to correspond with the requirements of the reciprocatory feeder which moves the stock forward sufficiently at each reciprocation to admit of the severance therefrom of a full sized blank.

The material 20, having been trimmed by knives 34 and 35 and scored by the scoring knives 39 and their cooperating rollers 40, is next threaded between a set of idling rollers 47 and 48 which are preferably rendered bodily adjustable by means of screws 49. Beyond the rollers 47 and 48, the material is advanced by a reciprocative feeding device, and between the idling rollers 47 and 48 and the positively actuated feeding rollers 23 and 24 the material is allowed to hang in a partial fold as indicated at 20′.

Upon each side of the machine, there is provided a longitudinally disposed rod 50 which, with the upper surface of the adjacent longitudinal frame member 3, forms a guideway in which the blocks 51 are longitudinally slidable. These blocks are simultaneously actuated by links 52, bell cranks 53 pivoted to the machine table at 54, and links 55 which are each adjustably connected with a crank element 56 upon the tubular shaft 29. The means by which motion is transmitted to shaft 29 have heretofore been explained. Through the mechanism just described, the sliding blocks 51 are made to reciprocate by the rotation of shaft 29. The degree of reciprocatory movement is made adjustable by a provision for varying the throw of crank member 56. A detailed view of this arrangement appears in Figs. 22 to 24, inclusive.

It will be noted that the member 56 is carried by a member 57 fast on the tubular shaft 29. Each member 56 is provided with a radially disposed slot 60 in which a nut 61 is guided. The nuts 61 carry pivot pins 62 to which the links 55 are secured. A screw 64 is threaded within each nut 61 and is journaled in each member 56. It will be evident that by the rotation of screw 64 the nut 61 may be caused to move radially of the crank member 56, thereby increasing or decreasing the throw of the crank and the corresponding reciprocation of the sliding blocks 51. In order to rotate screws 64 simultaneously, we have provided a shaft 65 disposed interiorly of the tubular shaft 29 and provided at its end with miter gears 66 meshing, respectively, with miter gears 67 carried by each of the worms 64. The extremity 68 of the interiorly disposed shaft 65 is made to receive a counterpart member 69 to which a manually operable crank 70 is attached. A spring 70′ within member 69 is arranged to force the manually operable crank off of shaft 65 to prevent injury to the mechanism such as might result if the crank were allowed to remain in position during the operation of the machine. When the manually operable crank 70 is rotated to turn shaft 65 relative to the tubular shaft 29, the screws 64 will be driven through miter gears 66 and 67 thereby moving the nut 61 radially and adjusting the degree of reciprocation of blocks 51.

The blocks 51 are connected by a pair of transverse rods 71 and 72 as well as by a rock shaft 73. The links 52 which actuate sliding blocks 51 are not directly connected to said blocks, but are connected to levers 74 which extend upwardly from the rock shaft 73 at each of its ends.

Transversely slidable upon the relatively fixed rods 71 and 72 are the stock gripping members 80 shown in detail in Figs. 27 and 28. Set screws 75 are provided for locking said stock gripping members in any desired position of adjustment upon rods 71 and 72. Each of said members is preferably L-shaped having an arm 76 extending beneath the side margin of the sheet of stock 20. With the arm 76, interacts a dog 77 keyed to the rock shaft 73 as shown in Fig. 27 and rendered axially adjustable thereon by means of a set screw 78. A stop 79 limits the movement of the dog in one direction, and its movement in the opposite direction is limited by contact with the stock 20 supported upon arm 76 of the device.

The arrangement is such that the initial movement of link 52 in either direction will oscillate the rock shaft 73 to the extent to which oscillation is permitted to said shaft. If the link 52 is moving rearwardly with respect to the stock, the dog 77 will be lifted out of contact with the stock and will abut against the stop 79. The reciprocatory feeder will thereupon move rearwardly without engaging or gripping the stop. As soon, however, as the movement of crank member 56 is such as to cause the link 52 to reverse its movement and move forwardly with respect to the stock, its initial movement in that direction will oscillate the rock shaft 73, thereby throwing dog 77 into clamping relation to the stock 20. The subsequent movement of link 52 will be transmitted to the sliding blocks 51 upon each side of the machine which will be caused to move forwardly. The members 80 supported from said blocks on rods 71 and 72 will also be carried forwardly and the stock, clamped in the manner above described, will be positively advanced for a predetermined distance. It will be understood that this distance is entirely controllable by an adjustment of the throw of crank member 56. It will hereinafter be explained that the adjustment should be such that the forward advance of the stock at each forward reciprocatory movement of the blocks 51 may correspond exactly to the desired length of the blank to be cut from said stock.

The stock as advanced by the reciprocatory feeding mechanism just described is trimmed and is scored longitudinally but is not scored transversely, and still remains uncut transversely. When the stock is fed into the machine at 22, it is simply a blank sheet such as is shown in Fig. 29. This sheet may be identical in width with the distance between the two sets of shearing knives above described, or it may be wider. If it is wider, the shearing knives will cut it longiturinally to the desired widths and the scoring blades 39 will act upon it to mark it as indicated at 81 in Fig. 30. The next operation to be performed by the machine is to sever from the strip 20 of stock at 82 a previously scored blank and simultaneously to mark upon the stock at 83 transverse score lines as indicated in Fig. 31. The mechanism by which these transverse score lines and the transverse cut at 82 are simultaneously made will now be described.

It is obviously desirable in a machine of this character which is adjustable to permit the manufacture of different sizes and shapes of boxes to score the strip 20 by score lines 83 disposed at variable distances from each other and to accomplish the adjustment of the scoring mechanism with the least possible interference with the means by which said mechanism is actuated. It is believed that an understanding of the above stated fact will lead to a more perfect appreciation of the mechanism by which these desired ends are accomplished. Above each of the longitudinally disposed side members 4 of the machine frame is provided a channelled member 85 which will hereinafter be termed a rail. Each end of each rail is carried by an upright rod 86, the extremities of said rods being threaded to receive upper and lower nuts 87 and 88 whereby the ends of the rails are independently vertically adjustable. The lower extremities of rods 86 are similarly threaded to receive the nuts 89 whereby the transverse bar 90 is rigidly connected to the rods 86 of each pair. These members are shown in detail in Fig. 17 and it is to be noted that the rods 86 of each pair are mounted for vertical movement together with their connecting bar 90. A pin 91 centrally disposed in each bar 90 carries a roller cam follower 92 operating in a cam groove 93 cut in the face of a cam 94 mounted upon the line shaft 7. The bar 90 may be provided, if desired, with a slotted guide member 95 slidable with respect to shaft 7 in the manner clearly illustrated in Fig. 17. The two cams 94 are arranged to operate synchronously so that the two rails 95 may simultaneously reciprocate vertically responsive to the action of said cams upon the cam followers 92.

The scoring knives 95 have reduced end portions 96 guided between the upper and lower flanges of the channel rails 85 for free sliding movement longitudinally of the machine. The flanges of the rails confine each knife 95 for vertical movement with said rails while permitting said knives to be adjusted longitudinally with ease.

The knives 95 are guided, positioned and secured in adjustment by the parallel guides 97 which may be secured together at their upper margins by a cross plate 98, as shown in Fig. 2. A flanged guide plate 99, secured to the frame members 4 upon each side of the machine as shown in Fig. 3, serves to support the outwardly extending foot 100 slidably mounted thereon. Thus, the parallel vertical guides 97 are slidably adjusted longitudinally of the machine and are adapted to carry with them the vertically movable blades 95.

The adjustment of the guides 97 may conveniently be effected by means of a right hand and left hand threaded screw 101 upon each side of the machine, each screw being threaded in one of the blocks 102 from which the foot 100 projects laterally and upon which the vertical guide members 97 are mounted. The arrangement is such that the rotation of screw 101 in one direction will move the scoring blades 95 closer together while a reverse rotation of screw 101 will move said blades apart. Screws 101 are simultaneously rotated through bevel gears 103 upon the screws 104 upon a transverse shaft 105 which may be actuated by a hand wheel 106. These parts are best shown in Fig. 1.

The material to be acted upon by the scoring blades 95 is threaded through registering slots 108 in each of the vertical guide members 97 and is supported by said members during the downward movement of the knife 95. If it is desired to position longitudinal supporting strips 5 beneath this portion of the mechanism, notches 109 may conveniently be cut in guides 97 to receive the strips 5 while permitting the sliding movement of said guides longitudinally with reference to said strips and to the frame of the machine.

The cutting blade 110, which severs from the scored sheet the more advanced blank which has previously been scored, is best shown in Fig. 2 and is mounted, guided and actuated in most respects like the scoring blades 95. The cutting blade, however, is provided with vertical guides 97', the supporting blocks 102' of which are not threaded upon the screw 101, but are provided with openings for said screw sufficiently large so that such screw will not contact with said blocks. Such an adjustment is necessary to permit the height of the sides of a box to be varied. For this reason, also, the knife 110 is located preferably exterior to one of its guide members 97' so that it may be brought more closely adjacent to the scoring blade 95. It is guided and actuated by bolt 111 from a transverse bar 112 vertically slidable between guide members 97' responsive to the vertical movement of rails 85 as heretofore explained. The bolt 111 preferably extends through a slot in one of the guide members 97' and is connected with the cutting knife 110 for the actuation thereof in an easily understood manner.

From the foregoing, it will be obvious that the vertically reciprocable rails 85 are adapted to impart vertical reciprocatory movement to the scoring blades 95 and to the knife 110 regardless of the position of longitudinal adjustment of said blades and knife. It will also be understood that the adjustment of the blades and knife is effected through mechanism for moving the guides 97 and 97'. The two sets of guides 97 for the scoring blades are mounted for simultaneous movement in opposite directions when the screw 101 is rotated. The guides 97' for the cutting blade 110 are independently adjusted since they are not threadably engaged with the screw 101.

As has previously been stated, each downward movement of the vertically reciprocable rails 85 causes the scoring blades 95 to make a pair of spaced transverse scores upon the end of the strip of material 20. Simultaneously, the knife 110 severs a blank of the form shown in Fig. 31 from the end of the strip which is being scored. The blank thus severed is drawn forwardly by mechanism hereinafter to be described out of the path of the scored strip. When the rails 85 have moved upwardly with the scoring blades 95 and the cutting knife 110, the reciprocatory feeding mechanism which includes dogs 77 advances the strip of material 20 for a sufficient distance so that during the next downward movement of rails 85, the cutting knife 110 may sever the scored portion of the strip to form a new blank. Obviously, the adjustment should be such that when the blank is severed, the transversely scored lines 83 will be equi-distant from the front and rear margins of the blank so that when said margins are bent to form the sides of a box, the sides will be of equal height upon both sides of the box. Such an adjustment is made possible by the provision for an independent movement of guides 97' with respect to the guides 97 of the adjacent scoring blade. The setting of the guides 97' will determine the distance of the cut margin 82 from the adjacent line of scoring 83. It is then necessary to adjust the throw of the crank member 56 so that the reciprocatory feeding mechanism will advance the strip 20 to a point where the next cut 82 will be at a like distance behind the second score line 83 of the newly formed blank.

It has been stated that as each blank is severed by the knife 110, it is withdrawn from the path of advance of the strip 20.

Figure 5:
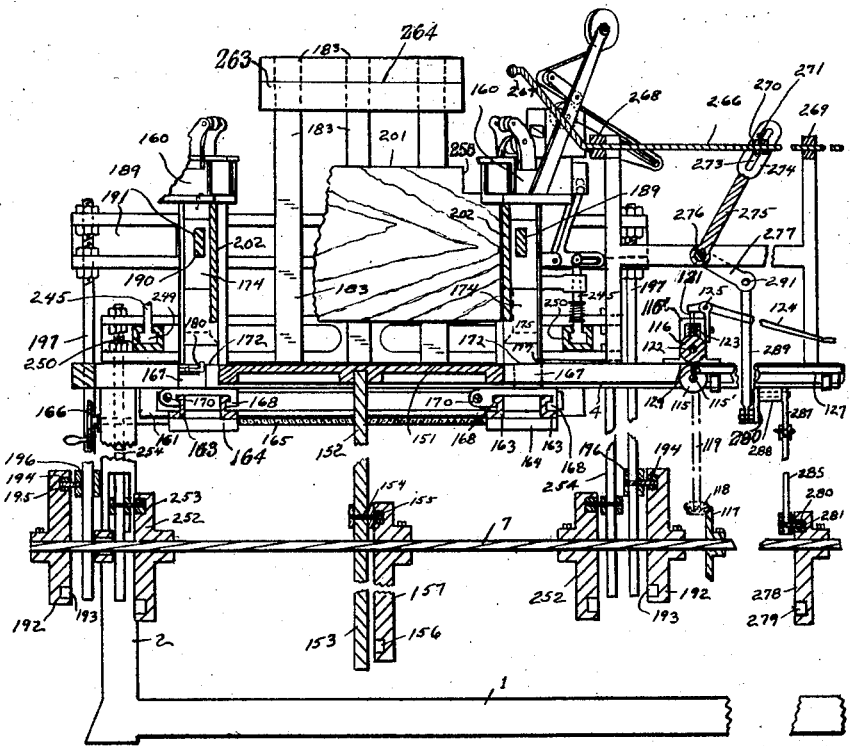
Fig. 5 is a section taken on the line 5—5 of Fig. 4.

Referring to Figs. 4 and 5, it will be noted that we have provided in the path of the strip 20 a pair of feed rollers 115 and 116, the former of which may be continuously actuated from the line shaft 7 through bevel gears 117, 118, shaft 119 and bevel gears 120 and 121, the last mentioned gear being on the projected shaft of the roller 115. The intermediate driving shaft 119 is inclined toward the observer as viewed in Fig. 5 and extends from the line shaft 7 at the center of the machine to the beveled gear 120 at the outer margin thereof. The roller 115 has its center portions cut away to receive a blank positioning device hereinafter to be described. For this reason, the roller 115 is not shown in section in Fig. 5.

The roller 116 is mounted for bodily vertical movement guided in the member 116'. The pin 121 is connected with the bearing shaft 122 of roller 116 for vertical movement therewith and a tension spring 123 wound upon said pin normally maintains said shaft and roller in an elevated position, whereby the forward extremity of the strip 20 may readily be fed between said rollers and will not be engaged by the driven roller 115 with any particular amount of forward propelling force. The lever 124, however, pivoted at 125 bears upon the upper end of pin 121, and when said lever is oscillated periodically about its pivot point, the roller 116 will be depressed to bind against the driven roller 115 the strip of material which is disposed between said rollers. An intermittent feeding action is thereby obtained.

For the purpose of actuating lever 124, there is an intermediate lever 126 which is best shown in Fig. 2. One extremity of lever 126 is disposed beneath the end of lever 124 and the other extremity of lever 126 is disposed beneath one of the rails 85. If desired, the lever mechanism heretofore described may be duplicated upon the opposite sides of the machine, and it has been so illustrated in the accompanying drawings. The arrangement is such that as the rails 85 move downwardly to actuate the scoring blades 95 and the cutting knife 110, a downward movement of said rails is transmitted through the opposing levers 126 and 124 and through the pin 121 to the axis shaft 122 of roller 116, thereby moving said roller downwardly. As the previously scored blank is severed from the sheet 20 of material, the newly severed blank is simultaneously subjected to the pressure of roller 116, thereby rendering the driven roller 115 operative to advance the blank rapidly out of the path of the strip 20. This intermittently acting feed mechanism, however, cannot serve to position a blank upon the box forming plunger and consequently a special positioning device must be used for this purpose.

The positioning device may comprise a reciprocable member 127 shown in Figs. 2, 3 and 5 and shown in detail in Figs. 15 and 16. It is immaterial whether the member 127 be made in one piece or whether, as shown in the drawings, it comprises a pair of parallel strips 128 spaced apart as shown to receive adjacent their extremities the gravity actuated dog 129. The dog 129 is pivoted at 130 and is so disposed that its greatest weight lies at one side of the pivot. Opposite the comparatively heavy portion 130' of the dog 129, is a tapered portion 131 adapted normally to project above the upper margins of the strips 128 but movable about the pivot pin 130 to a position where the tapered portion 131 will not so project. It will be noted by referring to Fig. 16 that a stop 132 is provided limiting the pivotal movement of the dog 129 in one direction. The arrangement is such that when the blank newly severed by the knife 110 is drawn by the intermittently operated feeding rollers 115 and 116 across the upper surface of the reciprocable positioning device 127, the tapered portion 131 of dog 129 may be depressed by the forward movement of the blank which takes place from right to left as viewed in Fig. 16. As soon, however, as the rear margin of the blank has passed over the tapered portion 131 of dog 129, the weighted portion 130' of said dog will cause the tapered portion 131 to become elevated behind the rear margin of the blank and thereby to engage said rear margin.

In Figs. 2 and 5, the reciprocatory positioning device 127 is shown in its retracted position. As has already been indicated, the roller 115 is divided to permit the device 127 to ride upon the axle shaft 115' thereof. The upper surface of the strips 128 is then in contact with the lower surface of the infeeding blank so that as soon as the blank has passed the dog 129, the dog may engage its rear margins.

In its retracted position, as shown, the reciprocatory feeder 127 extends through a slot 134 in each of the upright guide members 97 and 97' which provide guide ways for the scoring blades and cutting knives, respectively. The slot 134 is best shown in Figs. 2 and 3. The arm 135 carried by a cross piece 136 between the duplex members 128 which comprise the reciprocatory device 127 extends downwardly, as shown in Fig. 2, and is apertured to receive slidably the threaded rod 139 upon which a compression spring 137 is wound and is seated against the arm 135 and against a nut 138 threaded upon said rod. At its forward end, the rod 139 is provided with a clevis 140 through which extends a pin 141 working in a slot 142 in the lever 143 which is pivoted at 144, as shown. Beneath the pivot point, the lever 143 is pivotally connected at 145 to a peculiarly shaped lever 146, at the extremity of which is disposed a cam follower 147 working in a cam groove 148 in the cam 149 keyed to the line shaft 7. A compression spring 150 between levers 143 and 146 may be used, if desired, to maintain the cam follower 147 in slot 148. The arrangement is such that as the cam 149 rotates upon its axis, the comparatively small throw produced at the lower end of lever 143 by the cam follower 147 in the cam slot 148 becomes a comparatively great throw at the extremity of the longer, upper end of lever 143. The movement of the upper extremity of said lever is transmitted to the reciprocatory positioning device 127 through the rod 139, nut 138, compression spring 137 and arm 135. It is the function of spring 137 not only to cushion the initial movement of the lever 143 with reference to the arm 135 but also to provide for an automatic adjustment of the actuating mechanism to conform to the various degrees of reciprocative movement permitted to the positioning device 127.

The box forming plunger is shown at 151 and will be hereinafter more particularly described. It is the function of the positioning device 127 to engage by means of the dog 129 the rear margin of a blank advanced by the intermittent feeding rollers 115 and 116 and to move such a blank on to the plunger 151 and into registry with guides therefor provided. When different sizes of boxes are made, it is necessary to enlarge or contract the plunger to conform exactly to the inside dimensions of the bottom of the box. This can be done either by making an adjustable plunger or by having solid plungers such as that shown at 151 and mounting them interchangeably upon the plunger actuating post 152. In view, however, of the change in size of the plunger from time to time as adjustments are made to adapt the machine for the manufacture of boxes of varying sizes, it becomes necessary for the reciprocatory positioning mechanism 127 to move different distances to position blanks on the plunger. The system of levers 146 and 148 and the cam 149 are so arranged as normally to impart to the rod 139 the maximum movement which will ever be necessary to enable the forward extremity of the reciprocatory positioning member 127 to reach the side of the plunger and to position the blank thereon. Where the size of the plunger is such that a lesser movement is necessary, the positioning mechanism 127 will keep on moving until the blank reaches an adjustable stop which limits the further movement of the pushing device 127. All further movement of the rod 139 is absorbed by the compression spring 137. Thus without the necessity of making any manual adjustment, the movement of the positioning device is made automatically self-compensating to conform to changes in the size of plunger 151.

The plunger 151 in its retracted position has its upper surface conforming in height to the table over which the blank is fed thereto. The plunger is shown in its retracted position in the accompanying drawing. The plunger supporting post 152 is forked at 153 to straddle the line shaft 7 and to be guided thereby. A pin 154 disposed transversely with reference to the post 152 carries a cam follower 155 which rides in the cam groove 156 in the face of the disk cam 157 upon the shaft 7. The cam groove 156 is of peculiar contour and will hereinafter be described more particularly in connection with the detailed description of the movement imparted to the box forming plunger 151.

It will be remembered that the blank supplied to the plunger 151 is provided with four score lines intersecting adjacent the corners of the blank in the manner indicated in Fig. 31. The above described adjustments of the scoring and cutting mechanism make it possible not only to vary the size of the blank over all, but also to vary the distance of each score line from the adjacent parallel margin of the blank. It will be understood, however, that in each case the score lines must be equi-distant from their adjacent parallel blank margins in order that the several sides of the box may be of equal height. The plunger 151 which is used in any given case must correspond exactly in area with the area of that portion of the blank which lies within the score lines. As the plunger moves upwardly responsive to the cam actuated movement of the post 152, means is provided for bending downwardly those portions of the blank exterior to the score lines to form the sides of the box, but before these portions can be bent it is obviously necessary to cut away the corner portions of the blank exterior to the point of intersection of each layer of score lines. The mechanism by which the corners are cut away to leave the blank in the form in which it is shown in Fig. 32 will now be described.

The mechanisms for cutting away the corners of the blank are four in number and each is constructed as a unit with the mechanism for sealing up the side portions of the previously formed box at its respective corners. The units by which these functions are accomplished are illustrated in Figs. 6 to 13, inclusive, and in Fig. 37. The positions of these units with reference to the remainder of the machine are also clearly illustrated in Figs. 4 and 5. It will be understood that one of said units, hereinafter designated in its entirety by the numeral 160, will be located at each corner of the box forming plunger 151, the arrangement being such that the units 160 are adjustable laterally and longitudinally to conform to any desired changes in the shape or size of plunger 151. In Fig. 4, one of the units 160 is wholly omitted and another is shown only partially in order that the underlying mechanism may be clearly illustrated. In Fig. 5, one of the units 160 is shown complete and another is partially shown.

For details of the mounting of the units 160, reference is made to Figs. 18 to 20, inclusive. Beneath each of the frame members 4 is secured a channeled member 161 constituting a slideway for supporting the extremities 162 of the laterally disposed channeled guide members 163, said members being arranged in pairs as illustrated in Figs. 5, 18 and 19. The members 163 of each pair are connected by a device shown at 164 which is longitudinally apertured and threaded and in reality comprises an elongated nut. Right and left hand screws 165 pass through the nuts 164 and permit of the simultaneous adjustment of each pair of transversely disposed members 163 in opposite directions. A hand wheel 166 can conveniently be used to actuate each of the screws 165.

Slidably mounted upon each pair of transverse guides 163 are two of the units 160. The bases 167 of said units are formed to rest upon the top surfaces of the transverse guides 163 and interlocking flanges 168 are provided upon each of the base members 167 adapted to conform to, and slidably engage within, the channeled portions of the transverse guide members 163 in the manner clearly shown in Fig. 5. Each of the base members 167 is provided with an ear 169 provided with a threaded aperture at 170. When the units 160 are properly mounted upon their respective sets of guides 163 the apertures 170 of the units mounted upon each set of guides will be in alignment and may be connected for actuation by a transverse screw in precisely the same manner in which the sets of guides are simultaneously actuated longitudinally by means of screw 165. Thus a longitudinal relative adjustment between the several units 160 is made possible by a bodily sliding movement of the entire guideways which support said units and a transverse adjustment of said units is made possible by moving the units themselves relatively upon said guideway. In each case, the arrangement is preferably such that all movements will be simultaneous and in opposite directions so that irrespective of the amount of such adjustments, the several units will nevertheless be symmetrically disposed with reference to the longitudinal and transverse centers of any particular plunger 151 which it may be desired to use.

Each of the base members 167 is preferably made hollow having a vertically extending opening 171 therein. The interior of each base member 167 is thereby made open to the exterior of the machine through its bottom portion whereby pieces severed from the several blanks are allowed to drop between the transverse guide members 163 of each pair and thus to fall freely from the machine.

For the purpose of severing the corner pieces from the blanks, relatively fixed and movable die members are used. The base members 167 terminate in horizontal surfaces 172 at the level of plunger 151 in its retracted position. The inner margins of the surface 172 adjacent the opening 171 in each base member are rectangular, as clearly shown in Fig. 12. The exterior margins of said surface may be of any desired contour except that one margin is necessarily cut diagonally, as shown at 173 or are otherwise formed to permit the corner of plunger 151 to register substantially with the right angular corner of the opening 171 as shown in Fig. 12.

Vertically movable within the opening 171 in the fixed die member 172 is the movable die member 174 which may also be made hollow, if desired, in order that its margins may be beveled to a cutting edge as shown at 175 in Fig. 5. Each of the movable die members 174 is guided for vertical movement in uprights 176 supported from the base elements 167. By mechanism hereinafter to be described, the die members 174 are normally maintained in the elevated position in which they are shown in Fig. 5 with their cutting edges 175 clearing the fixed die member 172 by a considerable distance. In the space between the thus elevated movable die members 174 and the relatively fixed die members 172, each blank is successively introduced by the positioning mechanism 127 hitherto described.

To permit the blanks to be fed into position so that their corners will be supported upon the fixed die surfaces 172 and beneath the movable die plungers 174, it is essential that the upright members 176 be cut away at 177 as illustrated in Fig. 37. This is only necessary, however, in those units 160 which are disposed upon that side of plunger 151 from which the blanks are supplied, to wit:—the two units shown at the top of the sheet in Fig. 4. A slot 177 permits each blank to pass beneath the upright 176 which provides a vertical guide for the square die member 174 and thus makes it possible for the blank to be positioned accurately upon the plunger 151 with each of its corners beneath one of the corner cutting dies 174.

Inasmuch as the blanks not only vary in size but have variable portions exterior to the score lines to provide box sides of varying depths, it is necessary to provide adjustable stops adapted to cooperate with the positioning member 127 in disposing the blanks properly upon the plunger. To this end, those units 160 which are located at the rear of the machine (the units as shown in Figs. 4 and 5 at the right hand side of the sheet) are provided in the sides of their bases 167 with dovetailed slots 178 in which are adjustable the correspondingly shaped slides 179 carrying stops 180 adapted to be adjusted in the path of the infeeding blank to limit its rearward motion over the plunger.

Lateral stops may also be provided, if desired. A detail of a stop which may be used in this position is shown in Fig. 38. A transversely disposed member 181 divided at 182 to clear the member 183 hereinafter to be described is rendered adjustable with respect to the frame member 4 by means of the set screws 184 working in slots 185. The guard itself may comprise a longitudinally disposed piece 186 having curved end portions 187 adapted to engage and realign a blank which for some reason has become misaligned. If the blank positioning mechanism 127 is accurately centered, the lateral stops or guides 186 will not ordinarily be necessary.

As has previously been stated, the blank is centered upon the plunger 151 while the cutting dies 174 are in the elevated position in which they are shown in Figs. 5 and 37. The dies are maintained in an elevated position by means of the transversely disposed bars 189, each of which passes through slots 190 in two of the dies. The slots 190 are of a size and shape to receive bars 189 with a close sliding fit permitting the units 160 to be adjusted transversely of the machine while maintaining the stated operative association between bars 189 and the dies 174. Comparatively longer slots 190 in the uprights and guides 176 for the vertically reciprocable die members 174 serve to position the bars 189 while permitting them freedom of vertical movement. Obviously, when the bars 189 are moved vertically, the dies 174 will be correspondingly moved and will be actuated to and from blank cutting position.

The arrangement by which the bars 189 are reciprocated vertically in any desired position of longitudinal adjustment corresponds very closely to the arrangement by which the scoring blades and cutting knife are actuated and rendered adjustable in the mechanism shown in Figs. 1 and 2 and heretofore described. Rails 191 are made of channeled material and are disposed upon each side of the bed 3 of the machine. These rails correspond closely in their structure and relative position to the rails 85 hereinbefore discussed and shown in Figs. 1, 2 and 3. The extremities of bars 189 are longitudinally slidable between rails 191, but are fast between the flanges of the channeled rails for vertical reciprocation therewith. Obviously, this operative association between the vertically reciprocable rails 191 and the bars 189 is maintained despite any adjustment longitudinally of the machine of the units 160.

Vertical reciprocation is imparted to the rails 191 from the line shaft 7 by means of cam disk 192, cam grooves 193, cam followers 194, pins 195 upon which the cam followers are rotatable, transverse members 196 and the vertically extending rods 197 which carry the rails 191. The arrangement of the actuating mechanism just described corresponds closely to the actuating mechanism for the rails 85 which has heretofore been described and is shown in partial detail in Fig. 17. The effect of the cam induced, vertical reciprocation of rails 191 is to transmit vertical reciprocatory movement to the dies 174 and thereby to cause said dies to sever simultaneously the corners of each successive blank supplied to them. It will be apparent from the foregoing discussion that despite any adjustment which may be made either laterally or longitudinally with reference to the body of the machine the dies 174 will always be operatively associated through bars 189 with the vertically reciprocatory rail 191.

The effect of the action of the movable dies 174 in cooperation with the fixed die surfaces 172 is shown in Fig. 32 wherein the blank is shown to be ready for bending, its corner portions having been severed in conformity with the score lines upon the faces of the blank.

The actual bending of the blank is accomplished by the upward movement of plunger 151 upon which the blank is carried. During the period in which the corner cutting mechanism is operative, the cam disk 157 presents to the cam follower 155 a portion 199 of the cam groove 156 which portion 199 is concentric with shaft 7 and is at its minimum distance therefrom. The plunger 151 is thereby maintained stationary in its retracted position. As the cam 157 is rotated, however, the eccentric portion 200 of cam groove 156 is presented to cam follower 155, thereby elevating the plunger 151.

As the plunger 151 moves upwardly carrying on it the completed blank, as shown in Fig. 32, those portions of the blank exterior to score marks 81 and 83 are brought into contact with a set of blank folding members shown at 201 and 202, the members 201 being the longitudinally disposed members at the sides of the machine and the members 202 being the transversely disposed members at the ends. These blank bending members must correspond closely in shape and size to the plunger 151. The area enclosed by the bending members must be sufficiently greater than the area of the plunger to permit the folded side portions of the blank to lie between each of said folding members and the adjacent side of the plunger. When the plunger size is changed to form a different shape or size of box, it is essential, also, that the bending members 201 and 202 be correspondingly altered.

In reality, the plunger 151 comprises a male die member and the replaceably positioned elements 201 and 202 comprise a female die member within which the box is formed from a blank supported by the plunger 151. As the plunger moves upwardly, the lower surfaces of the forming members 201 and 202 encounter the laterally projecting flaps located exterior to the several score lines of the blank. The flaps are thereby bent downwardly into a position where they are adapted to form the sides of the box. In this position, they are maintained by the bending members 201, 202 until the cam disk 157 has rotated sufficiently so that the portion 203 of the groove therein is presented to the cam follower. The groove portion 203 is again concentric to shaft 7 and the plunger is thereby temporarily maintained in a stationary position pending the performance of the sealing operation in a manner now to be described.

The upright portion 176 of each unit 160 carries a slideway made up of the box-like member 205. Within each slideway, a corner forming die 206 is movable upon a line which, if projected, would bisect the adjacent rectangular corner of the plunger 151. In other words, the sides 207 and 208 of the rectangular slot 209 in the face of the forming die 206 are adapted to register with the sides of a box supported on plunger 151 and the forming die 206 is slidable to and from operative position upon a line of movement disposed at 45° to the major or longitudinal axis of the machine. In its advanced position, the corner forming die 206 will have its surfaces 207 and 208 in contact with the sides of the box immediately adjacent the unsecured corner thereof and by pressing said portions of the sides of the box against the corner portions of the underlying plunger 151 a neat and accurately rectangular corner will be shaped.

The die 206, however, not only shapes the corner of the box but also seals it in the desired position. A roll of gummed tape 210 is rotatably supported upon each unit 160 by an arm 211 as best shown in Fig. 6. For the purpose of moistening said tape and rendering it adhesive, it is passed about a guide roller 212 and led between the rollers 213 and 214, the former of which rotates continuously in a vat 215 of water or other suitable moistening fluid. The roller 214 is preferably spring-pressed by a compression spring shown at 216 and thereby maintains the tape in positive contact with the moistened surface of roller 213. After moistening, however, it is desirable to allow the gummed surface of the tape to dry for a certain period in order that it may have exactly the desired adhesive qualities. To this end, the moistened tape is passed about a roller 217, the shaft 218 of which is adjustably mounted in a slot 219 in the arm 220, the arrangement being such that by moving the shaft 218 in said slot the tape 210 may be allowed to dry for a greater or a lesser period.

From the roller 217, the tape is led between the feeding rollers 221 and 222, the latter being idle. The roller 221 is provided with a shaft 223 journaled in the bracket 224 and provided exterior thereto with a ratchet wheel 225 fast upon said shaft. The lever 226 is rotatable with respect to shaft 223, but is provided with a pawl 227 operatively associated with the ratchet wheel 225 whereby at each forward movement of lever 226, as viewed in Fig. 6, the rotary movement of the lever will be imparted through the pawl 227 and ratchet wheel 225 to the shaft 223, thereby causing the feeding roller 221 to become operative to expel a fresh length of adhesive tape 210. The reciprocatory movement of the forming die 206 can conveniently be utilized to oscillate lever 226 and thereby to impart an intermittent rotary movement to the roller 221. To this end, a pin 228 carried by the forming die 206 is projected outwardly through a slot 229 in the box-like slideway 205 in which the forming die is reciprocable. A lever 230 slotted at 231 to receive pin 228 and pivoted to the slideway 205 at 232 is adjustably connected by means of a collar 233 slidable longitudinally upon said lever and by a link 234 pivoted to said collar and to the lever 226 with said last mentioned lever. A set screw 235 may be utilized to secure the adjustable collar 233 in any desired position upon the extremity of lever 230. By changing the adjustment, the throw of lever 226 at each reciprocation of the plunger die 206 may be varied and obviously the rotation of the feed roller 221 will be correspondingly varied. By means of this mechanism, each rearward movement of the reciprocable forming die 206 is utilized to feed a new section of gummed tape into operative position in front of the forming die and the amount of tape so fed is entirely within the control of the operator.

Immediately above the forming die 206, is a tape guide 236, the construction of which is best shown in Figs. 10 and 11. The tape 210 is threaded through the peculiarly shaped opening 237 in the guide 236. The forward margin of the opening 237 corresponds in contour to the notch 209 in the face of the forming die. The arrangement is such that the tape fed through the opening 237 will hang in a single plane until it is acted upon by the forming die pressing it from the rear. At this time, the tape will be forced to assume the shape of the forward margin 237' of the opening 237 and eventually will be sheared by the continued forward movement of the die 206. The top of die 206 is intended to correspond with the height of the plunger when the portion 203 of the plunger actuating cam groove 156 is presented to its cam follower. Thus, as the forming die 206 moves toward the plunger and severs a bit of tape fed through the guide 236, the severed tape is immediately pressed against the contiguous corner margins of the sides of the box. The forming pressure exerted by the die 206 against the corner of plunger 151 is such as to press the adhesive surface of the tape 210 into a good firm contact with the margins of the box and due to the fact that the tape has been allowed partially to dry, it is in a condition to adhere tightly to the surfaces against which it is so pressed.

Following each corner forming stroke, the plunger 206 is retracted by mechanism hereinafter to be described and the retracted movement of the plunger is utilized as above stated to rotate the feeding rollers 221 and 222 and thereby to feed through the opening 237 and guide 236 a new supply of adhesive tape. The length of the tape or gummed paper strip 210 so supplied will, of course, be regulated to correspond to the height of the sides of the box which is being formed and inasmuch as the machine is adjustable to produce boxes of varying height, it will be obvious that varying amounts of tape will be fed at each reciprocation of the corner forming die 206.

Assuming that the corner forming die 206 reciprocates at a regular rate, it will be obvious that if it were not for the provision of the adjustable idling roller 217, it would be impossible to secure exactly the correct drying period for the gummed paper strip 210. By reason, however, of the provision of the adjustable idling roller 217, it is possible to secure in each adjustment of the tape feeding mechanism a correct period of drying so that the adhesive upon the tape will be in the best possible condition to adhere to the surfaces against which it is pressed by the die 206.

The immediate actuation of die 206 is effected through a bell crank 238, one arm 239 of which is provided with a head 240 working in a suitable recess 241 in the under side of the corner forming die 206. The other arm 242 of the bell crank is slotted at 243 to receive slidably a pin 244 disposed transversely with reference to a vertically reciprocable shaft 245 supported in a bearing 246 in the arm 247. The shaft 245 is made telescopically and resiliently adjustable by means of the interposition therein of a spring 248 which serves both as a compression and a tension spring. This arrangement is shown in detail in Fig. 13 and is not believed to need further description.

Immediately beneath the resilient joint in shaft 245, said shaft is provided with a head 249 slidable within a partially closed slot in the transversely disposed actuating member 250. One actuating member extends transversely across the machine upon each end, forwardly and rearwardly, of the units 160. The members 250 are vertically reciprocable by mechanism hereinafter to be described and serve to transmit their vertical reciprocatory movement to the vertically slidable shafts 245 irrespective of the adjustment of units 160.

The members 250 have their end portions slidably secured within the channeled portion and between the inwardly extending flanges of rails 251. Thus, when the units 160 are adjusted longitudinally of the machine, the members 250 can move with them within the channeled portions of rails 251 and nevertheless receive from said rails vertically reciprocatory movement. The rails 251 are actuated in the same manner as rails 191. They receive movement from the line shaft 7 through cam disks 252, cam followers 253, and the upright rods 254 upon which the rails 251 are carried.

From the foregoing it may be seen that while the plunger 151 is maintained in a temporarily stationary position, the corner forming dies 206 at the four corners of the partially shaped box are caused by the mechanism just described to move inwardly across the under face of the tape guides 236 with a shearing action and subsequently to press the severed pieces of tape simultaneously against the theretofore open corners of the box. It may be added that in order to permit this movement of the corner forming dies 206 the members 201 and 202 which bend the sides of the box downwardly may be cut away, if desired, in the manner shown at 255. In thus applying the severed pieces of adhesive tape to the corners of the newly formed box, the corner forming dies 206 move inwardly beyond the margins 256 of the tape guides 236 so that when the plunger 151 resumes its upward movement the newly formed and sealed box which is now complete, as illustrated in Fig. 35, will move freely within the tape guides and out of contact therewith.

After the box is completed in the form in which it appears in Fig. 35, the severed pieces 10′ of gummed tape 10 having been applied to the corners of the box as above stated, the plunger 151 resumes its upward movement, such movement being induced by the eccentric portion 260 of the groove 156 in cam 157.

Secured to the frame members 4 at the sides of the machine are the resiliently flexible upright strips 183. A wing nut 261 is preferably used upon a bolt 262 to secure the strips 183 to the frame, since, when a very small box is being made, it may be necessary to remove two of said strips in order to permit the corner units 160 to be moved inwardly toward the center of the box forming area. The strips 183 are inclined inwardly, as shown, and in fact extend inwardly over the tops of the bending members 201, 202.

It is the function of the resilient strips 183 to support wedge-shaped box engaging members 263 which are disposed preferably longitudinally of the machine and are shouldered at 264 to form a box receiving and supporting element.

As the completed box moves upwardly upon plunger 151, it bears against the resilient supports 183 and against the wedge-shaped longitudinally disposed guides 263. The arrangement is such that as the plunger attains its maximum upward movement, the shoulders 264 will spring in beneath the lower margins of the box. When the portion 265 of the plunger actuating cam groove 156 is presented to the cam follower, the plunger will be retracted fully to the position in which it is shown in Fig. 5. The completed box, however, will be retained in an elevated position upon the shoulders 264 of members 263 upon each side of the machine. In this position, the box will be at such a height that the units 160 will not interfere with its longitudinal ejection from the machine.

In order to accomplish this ejection, we provide an ejecting plunger 266 having a head 267 adapted to contact with the end wall of the completed box. Bearings are provided for the plunger at 268 and 269 in order that it may accurately be guided. A collar 270 rendered adjustable upon the plunger rod 266 by means of a set screw 271 carries laterally projecting pins 272 which engage with slots 273 in a clevis 274 forming part of a bell crank 275. The bell crank 275 is keyed to a rock shaft 276 disposed transversely of the machine and provided exteriorly to the machine frame with an arm 277. Reciprocatory vertical movement is transmitted to said arm from the line shaft 7 through the ejector cam 278, cam groove 279, cam follower 280 upon pin 281, lever 282 having a fixed pivot at 283 and normally maintained in a retracted position by a spring 284, link 285 pivoted to said lever at 286, bell crank 287 journaled in bracket 288, and link 289 pivoted to an outwardly extending arm 290 of the bell crank and also pivoted at 291 to the arm 277 of rock shaft 276. The cam mechanism is shown in detail in Fig. 21. The arrangement is such that at the proper time the cam groove 279 will act upon the cam follower 280 and impart movement through the levers and bell cranks above described to the ejecting plunger 266 which is thereby caused to move horizontally longitudinally of the machine and parallel to the shouldered members 263. Obviously, the rod or plunger 266 is adjustable through the collar 270 in such a way that its head 267 may always be immediately adjacent the end of each completed box so that the plunger will not acquire any appreciable momentum before the contact with the box to be ejected. The action of the plunger will be such that the box will be moved longitudinally of the machine guided by the members 263 upon which it rests until it is ejected from the end of the machine and either falls into a receiving basket or is delivered upon a conveyor such as would ordinarily be used to carry away the completed articles from a machine of this sort. In either case, it is a distinct advantage to have the finished product discharged at the top of the machine instead of at the bottom thereof, as has heretofore been the practice. The fact that the box forming plunger 151 moves upwardly during the forming operation makes it possible to drive all the mechanism of this machine from a single line shaft such as is shown at 7 without necessitating the use of complicated or heavy overhead driving connections. Furthermore, it is an obvious advantage to have the machine open at the top for inspection purposes so that the possibility of injury to employees is minimized. A further advantage arises incidentally in the fact that by discharging the completed boxes at the top instead of at the bottom or near the bottom, this machine makes it far easier to handle its output than has hitherto been the case.

Although the operation of this machine has been fully described in connection with the disclosure of its elements, it may possibly be advantageous to include in this description a brief summary of the operation in order that the inter-relation of the parts may be fully appreciated.

A strip of stock 20 is fed into the machine at 22 and is drawn from a roll 21 at a rate to suit the requirements of the machine by means of the adjustable feeding mechanism which may be utilized to drive shaft 25 and feed rollers 23 and 24.

As the material is fed into the machine, it is trimmed by the shearing knives 34 and 35 and is longitudinally scored by the rotary scoring blades 39 cooperating with supporting rollers 40.

The rollers 47 and 48 support the strip of stock 20 and place a suitable tension thereon. The stock is drawn between said rollers by an intermittent reciprocatory feeding device which includes the dogs 77. This device is adjustable in its stroke so that the amount of stock advanced by it in any given stroke will correspond exactly to the desired size of blank which is to be cut from said stock.

By the reciprocatory feeder, the stock is fed beneath the scoring blades 95 and a cutting blade 110 all of which are disposed transversely of the machine. At each operation of these blades and knife, the stock previously advanced by the above described feeding mechanism is transversely scored and a previously scored blank is severed therefrom. At this stage, the extremity of the strip of material 20 will appear as indicated in Fig. 31.

The severed blank is drawn away from the strip of stock by means of the intermittently operable feeding rollers 116 and 115 which are rendered operative upon the blank by means of lever 124 which is actuated by the depression of the scoring and cutting mechanism above described. Cooperating with the intermittently operable feed rollers 115 and 116 is a positioning device 127 which acts upon the blank after the feed rollers have advanced it to the limit of their power. The positioning device 127 pushes the blank on to the plunger 151 and suitable stops are so disposed as to limit the forward movement of the blank so that the central unscored area of the blank will correspond exactly to the top area of the plunger.

When the blank is so positioned, its corners exterior to the intersecting score lines 81 and 83 will lie beneath corner cutting dies which immediately descend and sever the corner portions of the blank. Thereafter the blank in the form in which it is shown in Fig. 32 is moved upwardly by the plunger 151 and the laterally extending strips at the sides of the blank are bent downwardly to form the sides of the box by means of the bending boards 201 and 202.

The plunger pauses in its upward movement with the partially formed box in horizontal registry with the corner forming plungers 206 in front of each of which a short section of previously moistened and partially dried gummed strips are dangling. The means for supplying these strips is adjustable so that the strips will correspond in length with the height of the sides of the box.

The corner forming plungers now move inwardly, severing the dangling portions of each of said strips and forcing them into contact with the sides of the box, thereby completing the formation of the four corners of the box simultaneously. As soon as these plungers have been retracted, the box forming plunger 151 resumes its upward movement and pushes the box to such a height that it can be engaged and supported upon the longitudinally disposed members 263 which are shouldered at 264 to receive it. The box forming plunger 151 is now retracted and the ejecting mechanism, including the ejecting head 267 and the plunger 266, becomes operative to slide the completed box upon shoulders 264 outwardly over the end of the machine. In the meantime, a properly scored and newly severed blank is being fed toward the plunger in the manner above described so that as soon as the plunger reaches its retracted position, as shown in Fig. 5, a new blank is immediately fed thereon and the process of cutting the corners of said blank, folding its laterally projecting tongues to form the sides of a box, and subsequently sealing said sides at their corners is repeated.

In the above brief discussion, the adjustable features of the mechanism have not been referred to. It will be remembered, however, that the design of the machine is such that adjustments are provided for, wherever such adjustments are necessary for the manufacture of different sizes and shapes of boxes. In fact, it must be obvious to those skilled in the art that the machine herein disclosed is able, within its capacity, to make boxes in which the width, the length, or the depth, or all three of said dimensions may be varied to any desired degree. The machine is such that it will work with equal effectiveness to produce boxes of all the sizes for which its various adjustments adapt it.

We believe that we have succeeded in devising a machine in which very few replacements of parts are necessary to accomplish the desired adjustments. It has been our effort to make the several parts adjustable within themselves as far as possible to avoid the removal of any part and the substitution of another therefor. It will be noted that in the entire machine the only parts which have to be replaced by other parts of different sizes when different shapes or sizes of boxes are to be manufactured are the following: the plunger 151, the boards 201 and 202 which fold downwardly the sides of the box as the plunger 151 moves upwardly, and the box supporting strips 263 which receive and support the finished product at its maximum height.

From the foregoing, it will appear that when the above described adjustments have once been made a machine of the character disclosed herein will continue to operate indefinitely without attention to produce the given size and shape of box for which it has been adjusted. Furthermore, the organization of this machine is very simple considering the complex nature of its functions. Accordingly, it will be seen that the objects of this invention are fully satisfied by the embodiment herein disclosed.

We claim:

1. Automatic box making machinery adapted to operate upon a continuous strip of stock, said machinery comprising the combination of means for scoring said stock to mark the juncture of the bottom and the sides of the box to be formed, means for severing from said strip of stock a blank including a squared portion thereof, means for cutting from said blank exterior to the score lines therein the corner portions, and means for bending the side portions of said blank with reference to the central portion thereof and sealing said side portions at their corners to form a completed box.

2. Automatic box making machinery including means for scoring stock with transverse lines and intersecting longitudinal lines, means for cutting from said stock the corner portions exterior to said score lines, means for folding said stock upon the lines scored as aforesaid, means for sealing the folded portions at their corners, and means for automatically advancing said stock through the machine between the successive operations aforesaid, each of said operations being automatically performed in synchronism with the movement of the stock through the machine.

3. An automatic machine for making boxes of cardboard, said machine including means for intermittently advancing the extremity of a continuous strip of cardboard stock, means for scoring said strip longitudinally and transversely, means for severing therefrom a scored portion, means for automatically positioning the severed portion of stock upon a plunger, means for cutting away from said portion the corner areas exterior to the score lines thereon, and means cooperative with said plunger for bending the stock to box-like form.

4. Box making machinery including the combination of infeeding mechanism adapted to act upon an endless strip of stock supplied from a roll, means associated with said infeeding mechanism for longitudinally scoring stock fed therethrough, reciprocative feeding mechanism of adjustable stroke adapted to advance the strip of stock for a distance equal in length to the desired blank, means for transversely scoring said stock, means for severing from the strip of stock a previously scored blank, intermittently operable feeding mechanism adapted to advance the severed blank, means for controlling said last mentioned feeding mechanism by said severing means, means for automatically cutting from said blank its four corner portions, and means for bending the sides of said blank together and securing them at their corners to complete the box.

5. An automatic box making machine including the combination with means for supporting a roll of stock, of feeding mechanism adapted to act upon stock drawn in a continuous strip from said roll, means for automatically cutting cruciform blanks from the stock acted upon by said feeding mechanism, means for bending said blanks to box-like form, and means for sealing the bent portions of said blanks at each corner.

6. Automatic box making machinery including the combination with means for supporting a roll of stock of feeding mechanism adapted to act upon a continuous strip of stock drawn from said roll, means for scoring the stock in said strip to indicate lines upon which said stock is to be bent, means for cutting a cruciform blank from the scored portion of the stock, means for bending portions of said blank upon the score lines, and means for simultaneously applying at each corner of said blank gummed strips adapted to secure the folded portions together to form a complete box.

7. An automatic box making machine adjustable to makes boxes of varying sizes, said machine including adjustable feeding mechanism adapted to act upon a continuous strip of stock, adjustable scoring mechanism adapted to score said stock at determinable intervals, adjustable severing mechanism adapted to cut from said stock a predetermined length of the scored portion thereof, means for automatically advancing the length so cut, a plunger of proper size adapted to receive each such length, means co-operating with said plunger to bend the stock upon the plunger at the score lines, and means for securing together the portions so bent, said last mentioned means being adjustable to and from said plunger and adapted to cooperate with plungers of varying sizes.

8. Automatic box making machinery including two sets of scoring elements, the elements of each set being adjustable to and from each other to score stock at varying distances, a stock severing knife adjustable with reference to one set of scoring elements, intermittently operable feeding mechanism adapted to advance the stock a determinable and adjustable distance and to cooperate with said knife to produce varying sizes of blanks, a plunger of a size to conform to the unscored central portion of each blank, adjustable means for simultaneously cutting away the corners of a blank upon the plunger to leave said blank in cruciform shape, blank bending means with which said plunger cooperates to form the sides of a box from portions of said blank, corner forming dies arranged to press the box sides together at their corners, and means associated with each of said dies for feeding adhesive material thereto, said feeding means being adjustable to feed an amount of such material corresponding in length to the height of the sides of the box.

9. Automatic box making machinery including intermittently operable stock advancing means adjustable to advance the stock to any one of a plurality of predeterminable distances at each operation, blank severing means cooperating with said stock advancing means to sever from the stock so advanced a blank corresponding in length to the distance of advance of the stock, adjustable means for scoring each blank in two directions prior to its severance, a plunger adapted to receive each blank subsequent to its severance, means automatically self-compensating to varying sizes of blanks for positioning each blank upon the plunger subsequent to its severance, and a set of units adjustable in two dimensions to and from the plunger each of said units including corner cutting mechanism adapted to operate on said blank, and corner sealing mechanism adapted automatically to secure together the sides of a box formed from said blank at their corners.

10. Automatic box making machinery including intermittently operable stock advancing means adjustable to advance the stock to any one of a plurality of predeterminable distances, blank severing means cooperating with said stock advancing means to sever from the stock so advanced a blank corresponding in length to the distance of advance of the stock, adjustable means for scoring each blank in two directions prior to its severance, a plunger adapted to receive each blank subsequent to its severance, means automatically self-compensating to varying sizes of blanks for positioning each blank upon the plunger subsequent to its severance, and a set of units adjustable in two dimensions to and from the plunger, each of said units including corner cutting mechanism adapted to operate on said blank and corner sealing mechanism adapted automatically to secure together the sides of a box formed from said blank at their corners, said corner sealing mechanism being adjustable to operate automatically regardless of the height of the box sides.

11. Automatic box making machinery including an elongated frame, a line shaft disposed longitudinally beneath said frame, infeeding mechanism adjacent one end of said frame and adapted to receive stock to be made into boxes, stock scoring mechanism adapted to score the infed stock longitudinally and transversely in pairs of lines adjustable as to their separation, intermittently operable feeding mechanism adapted to advance the stock and adjustable to secure different distances of advance in a given operation, automatically operable means for severing a blank from the stock so advanced, corner cutting mechanism adapted to leave said blank in cruciform shape, blank folding mechanism adapted to fold the cruciform blanks to box form, and corner sealing mechanism adapted to seal the sides of the formed box at their corners, and power transmitting connections whereby the power for all of the aforesaid operations is derived from said line shaft.

12. Box making machinery including a vertical movable box forming plunger, means for automatically feeding blanks on to the face thereof, and means for automatically cutting said blanks to cruciform shape upon the face of the plunger.

13. Box making machinery including a vertically reciprocatory box forming plunger, means for automatically feeding blanks to said plunger and positioning said blanks on the face thereof, means for automatically cutting the corners from said blanks to leave the blanks in cruciform shape while so positioned, means for moving said plunger upwardly, and relatively fixed means for cooperating with said plunger to bend the portions of said blanks laterally projecting from said plunger to form the sides of a box.

14. Box making machinery including a vertically reciprocatory box forming plunger, means for automatically feeding blanks to said plunger and positioning said blanks on the face thereof, means for automatically cutting the corners from said blanks to leave the blanks in cruciform shape while so positioned, means for moving said plunger upwardly, relatively fixed means for cooperating with said plunger to bend the portions of said blanks laterally projecting from said plunger to form the sides of a box, and means positioned at each corner of said plunger for applying to the folded portions of the blank suitable lengths of adhesive material.

15. Box making machinery including a vertically reciprocatory box forming plunger, means for automatically feeding blanks to said plunger and positioning said blanks on the face thereof, means for automatically cutting the corners from said blanks to leave the blanks in cruciform shape while so positioned, means for moving said plunger upwardly, relatively fixed means for cooperating with said plunger to bend the portions of said blanks laterally projecting from said plunger to form the sides of a box, means positioned at each corner of said plunger for applying to the folded portions of the blank suitable lengths of adhesive material, means for supporting the completed box during the retraction of the plunger, and means for ejecting a box so supported from the machine.

16. Box making machinery including a box forming plunger, supporting means for said plunger adapted interchangeably to receive plungers of varying sizes, adjustable mechanism for cutting and supplying to said plunger blanks of varying sizes, and a unit disposed at each corner of said plunger, carrying mechanism cooperating with said plunger for completing the shaping of blanks thereon, bending said blanks to boxlike form, and sealing the corners of the bent blanks.

17. A box making machine including a vertically reciprocable plunger, plunger supporting means adapted to receive interchangeably plungers of varying sizes, adjustable means for forming and supplying to said plunger blanks of varying sizes and for automatically positioning said blanks with respect to said plunger irrespective of size, and a unit associated with each corner of the plunger for cooperating with the plunger to complete the formation of a box from each blank so positioned, means for adjusting each of said units, and means for actuating the mechanism of each unit irrespective of its position of adjustment.

18. A box making machine including a vertically reciprocable plunger, plunger supporting means adapted to receive interchangeably plungers of varying sizes, adjustable means for forming and supplying to said plunger blanks of varying sizes and for automatically positioning said blanks with respect to said plunger irrespective of size, and a unit associated with each corner of the plunger for cooperating with the plunger to complete the formation of a box from each blank so positioned, means for adjusting each of said units, and means for actuating the mechanism of each unit irrespective of its position of adjustment, said means including elements vertically reciprocable with reference to said unit and elements carried by said unit and horizontally slidable with reference to said vertically reciprocable elements while connected for vertical reciprocation therewith.

19. Box making machinery including a machine frame, a vertically reciprocable box forming plunger disposed centrally thereon, means providing a first slideway longitudinally of said frame, a subordinate frame element movable in said slideway, said subordinate frame element being adapted to provide a second slideway transversely of the main frame, and corner cutting mechanism slidably mounted upon the subordinate frame element, said corner cutting mechanism being adjustable in two dimensions with respect to said plunger.

20. Box making machinery including a main frame providing a first slideway, a vertically reciprocable element disposed therein and adapted to support any one of a plurality of box forming plungers, a subordinate frame element associated with said first slideway and providing a second slideway transversely of the frame, a corner cutting, forming and sealing unit slidably associated with said subordinate frame element and movable in two dimensions with respect to said plunger supporting element, corner cutting mechanism carried by said unit, and means for actuating said mechanism irrespective of the adjustment of said unit.

21. Box making machinery including a main frame providing a first slideway, a vertically reciprocable element disposed therein and adapted to support any one of a plurality of box forming plungers, a subordinate frame element associated with said first slideway and providing a second slideway transversely of the frame, a corner cutting, forming and sealing unit slidably associated with said subordinate frame element and movable in two dimensions with respect to said plunger supporting element, corner cutting mechanism carried by said unit, a corner forming die carried by said unit, tape feeding mechanism actuated in synchronism with the movement of said die and deriving motion therefrom, and means for actuating said corner cutting mechanism and forming die irrespective of the position of adjustment of said unit.

22. Box making machinery including a machine frame providing a first slideway, a pair of subordinate frame elements associated with said slideway, means for actuating said elements simultaneously in opposite directions, a pair of die supporting units slidably mounted upon each of said elements, said units each being adjustable in two horizontal directions, means symmetrically disposed within said frame for alternatively supporting box-forming plungers of varying sizes, means for automatically supplying to plungers so supported blanks of varying sizes, two of said units being formed to admit said blanks upon the plungers, a plunger positioned upon said plunger-supporting means and adapted to receive each blank upon its face, and a corner cutting die associated with each unit and adapted simultaneously to sever four corners from each blank.

23. Box making machinery including a machine frame providing a first slideway, a pair of subordinate frame elements associated with said slideway, means for actuating said elements simultaneously in opposite directions, a pair of die supporting units slidably mounted upon each of said elements, said units each being adjustable in two horizontal directions, means symmetrically disposed within said frame for alternatively supporting box forming plungers of varying sizes, means for automatically supplying to plungers so supported blanks of varying sizes, two of said units being formed to admit said blanks upon the plungers, a plunger positioned upon said plunger-supporting means and adapted to receive each blank upon its face, and a corner cutting die associated with each unit and adapted simultaneously to sever four corners from each blank, and means for actuating said dies irrespective of the position of said units.

24. Box making machinery including a machine frame providing a first slideway, a pair of subordinate frame elements associated with said slideway, means for actuating said elements simultaneously in opposite directions, a pair of die supporting units slidably mounted upon each of said elements, said units each being adjustable in two horizontal directions, means symmetrically disposed within said frame for alternatively supporting box forming plungers of varying sizes, means for automatically supplying to plungers so supported blanks of varying sizes, two of said units being formed to admit said blanks upon the plungers, a plunger positioned upon said plunger-supporting means and adapted to receive each blank upon its face, and a corner cutting die associated with each unit and adapted simultaneously to sever four corners from each blank, and means for actuating said dies irrespective of the position of said units, said means including transversely disposed bars each slidably associated with two of said dies, longitudinally disposed rails slidably associated with said bars while adapted to transmit vertical reciprocatory movement thereto, and means for actuating said vertically reciprocable rails.

25. Box making machinery including a box forming plunger arranged to move upthe blank adjacent their corners, means for supplying a length of gummed material to the face of said last mentioned means, means for adjustably actuating said supplying means whereby the length of material so supplied may be made to conform to the height of the downfolded portions of the blank, means for receiving and supporting the completed box subsequent to the further advance of said plunger, means for retracting the plunger from within the box to its initial position, and means for ejecting the box from the machine, means for actuating said corner cutting means irrespective of the position of adjustment of said units, and means for independently actuating said corner forming means irrespective of the position of said units.

31. In a box forming machine, the combination with intermittently operable feeding mechanism for stock, of actuating connections therefor variable to control the extent to which stock is advanced by said mechanism in a given operation, an adjustable blank severing knife, connections synchronized for the actuation of said knife subsequent to each stock advance to sever a blank equal in one dimension to the extent of stock advance, adjustable scoring blades disposed in the path of the unsevered stock and arranged to score it longitudinally and transversely, a box forming plunger, a fixed die member co-operable therewith, and corner cutting and sealing devices disposed in units and successively operable upon each corner of each blank and adjustable to each corner of said plunger.

32. In a box making machine, a frame providing an elongated path for material, feeding mechanism intermittently operable upon a continuous strip of material to advance it upon said path, scoring blades disposed in pairs and mounted in the path of the material, a cutting knife reciprocable to sever said material transversely into blanks, advancing mechanism for blanks so severed, a plunger adapted to receive the blanks, a stop for positioning blanks upon the plunger, corner cutting mechanism, plunger actuating mechanism, relatively fixed elements cooperable with the plunger to bend side portions of blanks thereon, tape supplying devices, corner forming dies for applying tape to the bent corner portions of blanks upon the plunger, and synchronized power transmitting connections for the moving parts above enumerated whereby the machine is automatically operable to produce complete boxes from strip stock.

33. In a box making machine, a frame providing an elongated path for material, feeding mechanism intermittently operable upon a continuous strip of material to advance it upon said path, scoring blades disposed in pairs and mounted in the path of the material, a cutting knife reciprocable to sever said material transversely into blanks, advancing mechanism for blanks so severed, a plunger adapted to receive the blanks, a stop for positioning blanks upon the plunger, corner cutting mechanism, plunger actuating mechanism, relatively fixed elements cooperable with the plunger to bend side portions of blanks thereon, tape supplying devices, corner forming dies for applying tape to the bent corner portions of blanks upon the plunger, and synchronized power transmitting connections for the moving parts above enumerated whereby the machine is automatically operable to produce complete boxes from strip stock, said machine being arranged to permit replacement of said plunger and fixed elements and being provided with adjustments where necessary, whereby boxes of various sizes are producible automatically as aforesaid.

ORLANDO A. CLARK.
GEORGE P. ANDERSON.

wardly from its retracted position, means for automatically supplying rectangular blanks to said plunger and positioning such blanks symmetrically upon the face thereof, means for imparting to the plunger an initial upward movement, relatively fixed means adapted to cooperate with the plunger during the initial upward movement to bend downwardly the portions of said blanks overhanging the sides of said plunger, forming dies adapted to cooperate with said plunger subsequent to its initial upward movement and to apply adhesive material to the bent portions of said blanks adjacent the corners of said plungers whereby the bent portions are sealed together to comprise box sides, means for subsequently causing the plunger to make a further upward advance, means for sustaining the completed box to permit the retraction of the plunger from within it, and means for ejecting from the machine a box so sustained.

26. In a box making machine, corner sealing mechanism including a horizontally reciprocable corner forming die, means for supporting a roll of gummed material, means for feeding a strip of material from a roll to the face of said die, means for actuating said feeding means while said die is inoperative, means for adjusting said actuating means to control the length of the strip of material supplied by said feeding means to the face of the die, means for moistening the face of the gummed material and an idling roller adjustable in the path of the strip of gummed material to provide a path of varying length whereby a suitable drying period may be provided for said material irrespective of the rate of feeding.

27. In a box making machine a corner unit including an upright, a corner cutting die vertically reciprocable therein, and means supported above said die for sealing together the corner portions of the sides of a box.

28. In a box making machine adapted to utilize box forming plungers of varying sizes, the combination with a machine frame, of a set of corner cutting and sealing units adjustable in two horizontal dimensions with respect to said frame and adapted to be symmetrically disposed with reference to any plunger utilized in the machine, an upright structural element forming a part of each unit, vertically reciprocable corner cutting dies mounted in each of said elements and adapted to act upon a blank supported by a plunger in the machine, and means carried by the upright element of each unit for applying determinable lengths of adhesive material to suitable portions of such a blank subsequent to the cutting operation.

29. In a box making machine adapted to utilize box forming plungers of varying sizes, the combination with a machine frame, of plunger actuating mechanism including means for producing an initial upward movement of a plunger, allowing a plunger to rest momentarily and subsequently renewing the upward movement thereof, a plunger removably supported upon said actuating mechanism, adjustable means for scoring and cutting a blank to be delivered to the plunger, means for symmetrically positioning a blank upon the face of the plunger irrespective of its size or the position of its score marks, corner units adjustable with reference to each corner of the plunger in a horizontal plane, means carried by said units for cutting away the corners of a blank supported by the plunger prior to its initial movement, means arranged to cooperate with said plunger during the initial movement to bend downwardly the portions of a blank which project beyond the face of the plunger, means carried by each corner unit and operative during the momentary rest of the plunger for cooperating with said plunger to act upon the downwardly bent portions of the blank adjacent their corners, means for supplying a length of gummed material to the face of said last mentioned means, means for adjustably actuating said supplying means whereby the length of material so supplied may be made to conform to the height of the down folded portions of the blank, means for receiving and supporting the completed box subsequent to the further advance of said plunger, means for retracting the plunger from within the box to its initial position, and means for ejecting the box from the machine.

30. In a box making machine adapted to utilize box forming plungers of varying sizes, the combination with a machine frame, of plunger actuating mechanism including means for producing an initial upward movement of a plunger, allowing a plunger to rest momentarily and subsequently renewing the upward movement thereof, a plunger removably supported upon said actuating mechanism, adjustable means for scoring and cutting a blank to be delivered to the plunger, means for symmetrically positioning a blank upon the face of the plunger irrespective of its size or the position of its score marks, corner units adjustable with reference to each corner of the plunger in a horizontal plane, means carried by said units for cutting away the corners of a blank supported by the plunger prior to its initial movement, means arranged to cooperate with said plunger during the initial movement to bend downwardly the portions of a blank which project beyond the face of the plunger, means carried by each corner unit and operative during the momentary rest of the plunger for cooperating with said plunger to act upon the downwardly bent portions of